US006994110B2

(12) United States Patent
Barillot et al.

(10) Patent No.: US 6,994,110 B2
(45) Date of Patent: Feb. 7, 2006

(54) PIEZOELECTRIC VALVE

(75) Inventors: François Barillot, Grenoble (FR); Gilles Patient, Vif (FR); Ronan Le Letty, Grenoble (FR)

(73) Assignee: Cedrat Technologies, Meylan (FR)

( * ) Notice: Subject to any disclaimer, the term of this patent is extended or adjusted under 35 U.S.C. 154(b) by 322 days.

(21) Appl. No.: 10/369,611

(22) Filed: Feb. 21, 2003

(65) Prior Publication Data
US 2003/0159735 A1 Aug. 28, 2003

(30) Foreign Application Priority Data
Feb. 26, 2002 (FR) .................................. 02 02425

(51) Int. Cl.
*F16K 37/00* (2006.01)
(52) U.S. Cl. ............... 137/554; 251/129.06; 251/335.3
(58) Field of Classification Search ............... 137/554; 251/129.06, 335.3, 335.2, 335.1
See application file for complete search history.

(56) References Cited

U.S. PATENT DOCUMENTS

| 4,635,683 A | * | 1/1987 | Nielsen ................. 251/129.15 |
| 4,695,034 A | * | 9/1987 | Shimizu et al. ........ 251/129.06 |
| 4,796,854 A | * | 1/1989 | Ewing .................... 251/129.07 |
| 4,808,874 A | | 2/1989 | Stahlhuth |
| 4,954,799 A | * | 9/1990 | Kumar ................... 251/129.08 |
| 5,031,841 A | * | 7/1991 | Schafer ................. 251/129.06 |
| 6,311,950 B1 | * | 11/2001 | Kappel et al. ......... 251/129.06 |
| 6,807,875 B2 | * | 10/2004 | Lebrun et al. ............... 137/554 |

FOREIGN PATENT DOCUMENTS

| DE | 198 54 506 C1 | 4/2000 |
| EP | 1 070 844 A1 | 1/2001 |
| EP | 1 079 098 A2 | 2/2001 |
| FR | 2 740 276 A1 | 4/1997 |
| FR | 2740276 | * 4/1997 |

* cited by examiner

*Primary Examiner*—John Rivell
(74) *Attorney, Agent, or Firm*—Oliff & Berridge PLC

(57) ABSTRACT

The valve comprises a mobile needle having a movement in the valve body which is controlled by an amplified piezoelectric actuator. A bellows, surrounding an intermediate zone of the needle, is integral at a first end with the valve body and at a second end with the needle so as to isolate the actuator from the pressure chamber. At least one flexible guide blade of the needle is fixed on the one hand to the valve body and on the other hand to the needle. This flexible guiding enables any part sliding with respect to another part, liable to generate wear or contaminating particles, to be avoided, except for the seat and needle.

18 Claims, 7 Drawing Sheets

PIEZOELECTRIC VALVE

BACKGROUND OF THE INVENTION

The invention relates to a valve comprising a valve body, a seat situated in a pressure chamber and integral with the valve body, and a mobile needle having a movement controlled by an amplified piezoelectric actuator.

STATE OF THE ART

The valve described in U.S. Pat. No. 4,808,874 and designed to regulate the flow of hot gases is actuated by an amplified piezoelectric actuator. The main advantage of an amplified piezoelectric actuator in this type of application is the possibility of achieving an actuator enabling an actuating rod to be pulled, by applying an electric voltage to the actuator. Another type of amplified actuator described in Patent FR-A-2,740,276 also enables this operation to be performed. This results in the possibility of constructing a normally closed valve with a particularly advantageous geometry, to achieve a proportional valve.

However, in state-of-the-art valves, the isolation between the actuator and a gas-filled pressure chamber wherein the valve seat is situated is achieved by means of an O-ring, which presents two drawbacks:

friction problems leading to a limited lifetime and/or generation of particles which may be bothersome in certain applications, for example in the space field or in instrumentation, especially when the movement of the needle must only be from about a few micrometers to 150 μm.

creation of a friction force making fine control of the position of the actuating rod more difficult.

Patent EP-A-1,070,844 describes a valve controlled by an amplified piezoelectric actuator wherein the amplified piezoelectric actuator is not isolated from the pressure chamber and is consequently placed in the gas, which may give rise to contamination problems. Furthermore, when the gas is corrosive, this configuration requires the piezoelectric actuator to be protected.

OBJECT OF THE INVENTION

The object of the invention is to achieve a valve not presenting the drawbacks of state-of-the-art valves and, more particularly, a piezoelectric valve without any parts moving with respect to one another, except for the seat and the needle.

According to the invention, this object is achieved by the fact that the valve comprises a bellows surrounding an intermediate zone of the needle and securely affixed, at a first end, to the valve body and, at a second end, to the needle so as to isolate the actuator from the pressure chamber, at least one flexible guide blade for guiding the needle being fixed on the one hand to the valve body and on the other hand to the needle.

According to a development of the invention, the valve comprises a second flexible guide blade, the flexible guide blades being arranged on each side of the bellows to perform parallelogram type guiding.

BRIEF DESCRIPTION OF THE DRAWINGS

Other advantages and features will become more clearly apparent from the following description of particular embodiments of the invention given as nonrestrictive examples only and illustrated in the accompanying drawings in which.

DESCRIPTION OF PARTICULAR EMBODIMENTS

Figure 1:
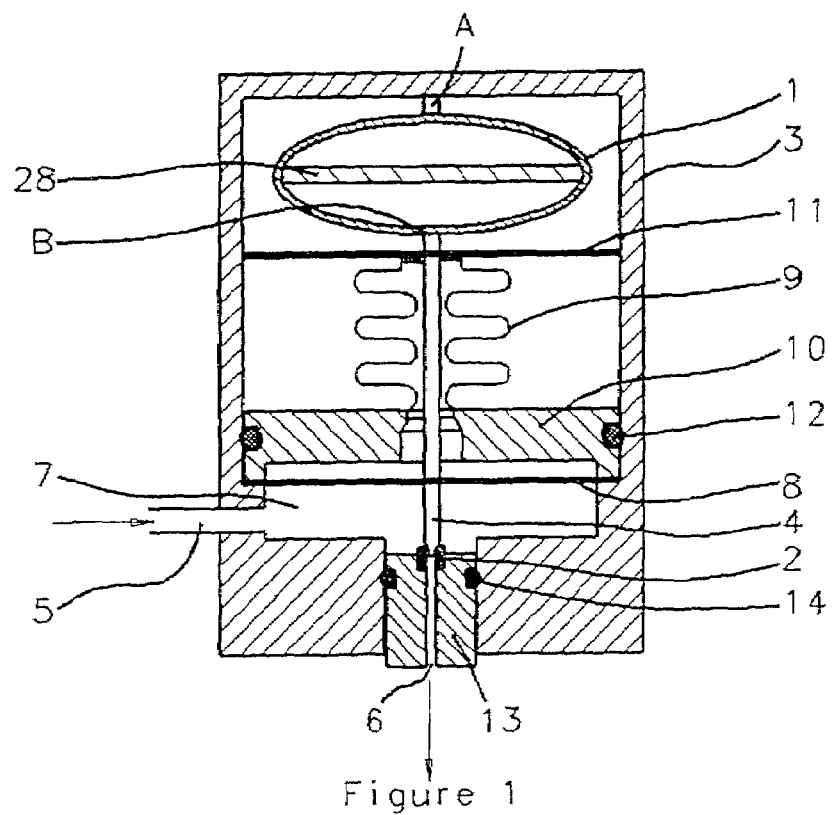
FIG. 1 schematically illustrates a first embodiment of a normally closed valve according to the present invention, in cross-section.
Figure 2:
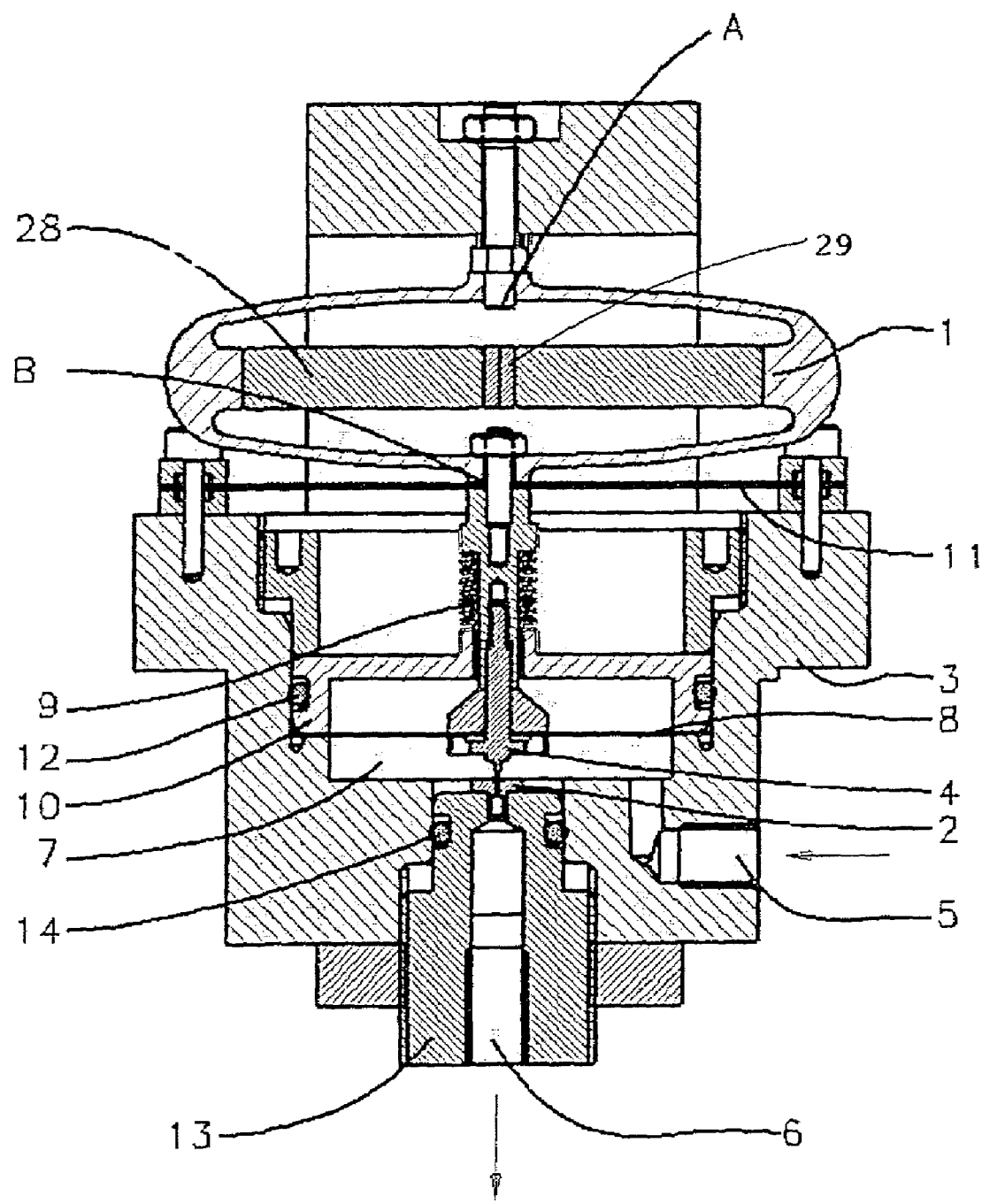
FIG. 2 represents a particular embodiment of the valve according to FIG. 1 in greater detail, in cross-section.

FIG. 1 represents a schematic cross-sectional view of a normally closed proportional valve comprising an amplified piezoelectric actuator 1. The amplified piezoelectric actuator 1 is preferably of the type described in Patent FR-A-2,740,276. In FIGS. 1 and 2, the actuator 1 comprises, at its bottom part, a base facing the seat 2 of the valve, and, at its top part, a mobile top opposite the base, a point A of which top, situated substantially in the center of the top, is integral with the valve body 3. The valve comprises a needle 4 fixed to the amplified piezoelectric actuator 1 at a point B of the base, situated substantially in the center of the base. The actuator 1 is thus connected both to the valve body 3 and to the needle 4, an electric voltage applied to the actuator causing upwards motion of the needle 4, away from the seat 2, so as to open the valve and allow controlled flow of a fluid (gas or liquid) from an inlet 5 to an outlet 6 of the valve. The seat 2 is situated in a pressure chamber 7 in permanent communication with the inlet 5.

A first flexible guide blade 8 is fixed on the one hand to the valve body 3 and on the other hand to the needle 4. It essentially has the function of guiding the needle and contributes in addition to centering thereof, thus enabling vibrations to be limited. In FIGS. 1 and 2, the flexible guide blade 8 is located in the pressure chamber 7, in the bottom part of the valve. A bellows 9 surrounding an intermediate zone of the needle 4 is securely affixed, at a first end, to the valve body 3 and, at a second end, to the needle 4. The bellows 9 can be electroformed or hydroformed. In FIG. 1, the first end of the bellows is fixed onto a cover 10 securely affixed to the valve body 3 by any appropriate means. The flexible blade is then preferably fixed to the valve body 3 by engagement of its periphery between the cover 10 and the valve body 3.

Figure 3:
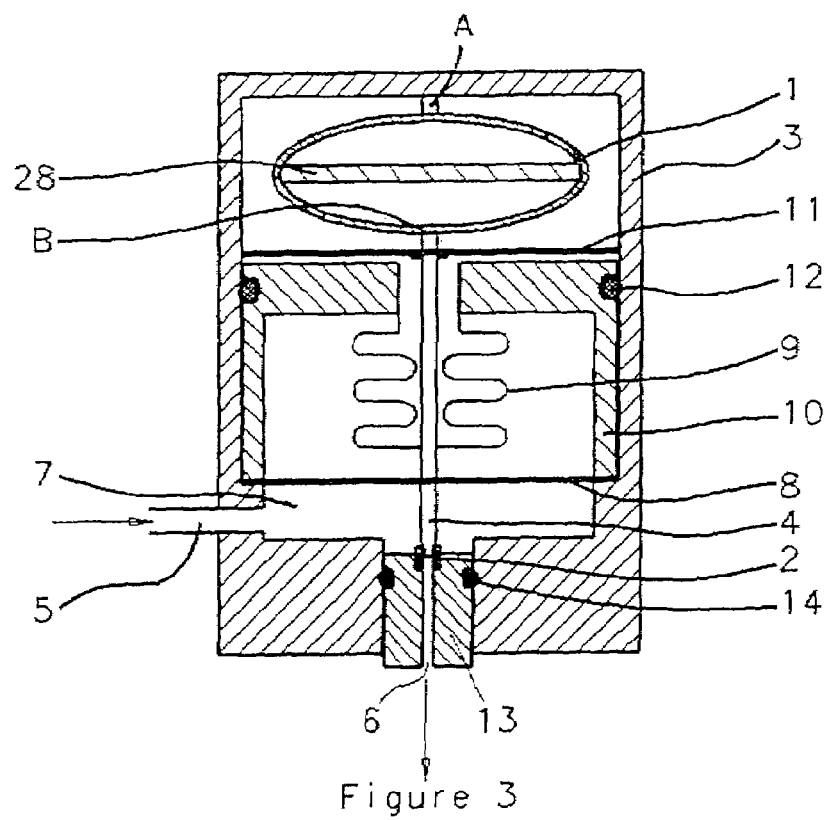
FIG. 3 schematically illustrates a second embodiment of a normally closed valve according to the present invention, in cross-section.

In FIGS. 1 and 2, the needle 4 is fixed to the top end of the bellows 9, the bottom end whereof is fixed to the cover 10. The inside of the bellows 9 is thus placed in the pressure chamber 7. In the embodiment of FIG. 3 on the other hand, the needle 4 is fixed to the bottom end of the bellows 9, the top end whereof is fixed to the cover 10. The outside of the bellow 9 is then placed in the pressure chamber 7. Such a configuration may be preferred for a better strength of the bellows when the upstream pressure is high. In both cases, the bellows 9 isolates the piezoelectric actuator 1 from the pressure chamber 7, thus protecting the actuator. The tight connections of the bellows with the cover 10 on the one hand and the needle 4 on the other hand are achieved by any suitable means, for example by brazing or soldering.

A second flexible guide blade 11 is preferably fixed, like the first blade, on the one hand to the valve body 3 and on the other hand to the needle 4. The flexible guide blades are then arranged on each side of the bellows 9. The second flexible guide blade is thus located, like the actuator 1, outside the pressure chamber 7. In this way guiding of the needle 4 is performed in the form of a parallelogram and the lack of stiffness of the bellows 9 can be compensated.

The needle 4 thus forms part of a mobile assembly also comprising the bellows 9, the first flexible guide blade 8 and, if applicable, the second flexible guide blade 11.

The structure of the mobile assembly described above enables a valve to be obtained without any parts moving with respect to another part, except for the seat 2 and needle 4. The lack of any parts moving with respect to one another prevents any generation of particles liable to subsequently obstruct the orifice of the valve. Moreover, the actuator can then be exchanged without dismantling the mobile assembly of the valve.

Pressure isolation between the cover 10 and body 3 is preferably achieved by means of an O-ring 12. The seat 2 is supported by a seat-holder 13 joined to the valve body 3 by a threaded connection. This enables the seat and needle to be made to come into contact, when the valve is fitted, with a progressive force enabling the needle to be centered. The tightness between the valve body and seat-holder 13 is preferably achieved by means of an O-ring 14.

Figure 4:
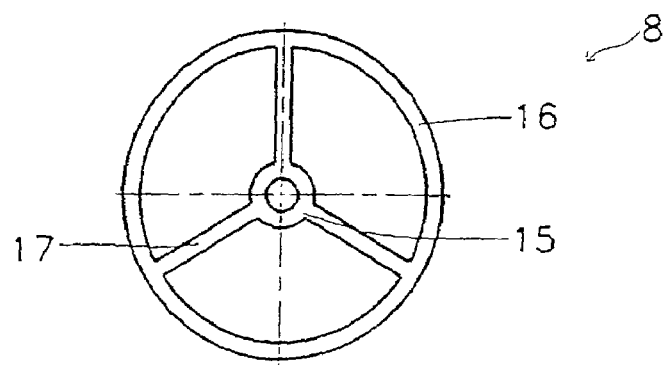
FIGS. 4, 5 and 6 represent three alternative embodiments of a flexible guide blade of a valve according to the invention.
Figure 5:
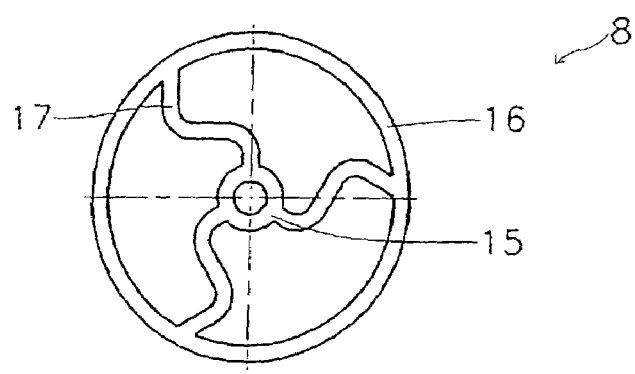
Figure 6:
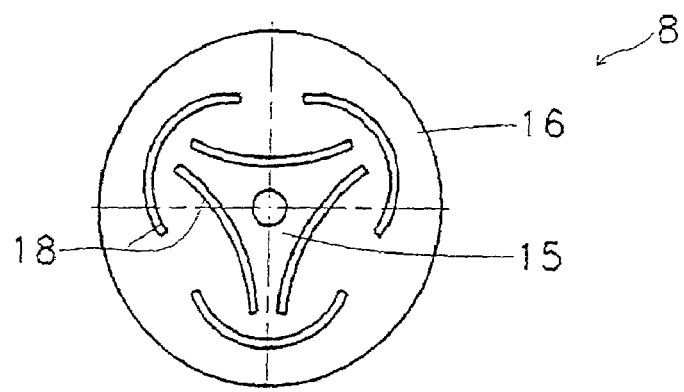

Various alternative embodiments of the flexible guide blades 8 are illustrated in FIGS. 4 to 6. The flexible guide blades 11 can be identical to the blades 8. Each flexible guide blade 8 preferably comprises a central zone 15 designed to be fixed to the needle 4 and a peripheral zone 16 designed to be fixed to the valve body 3. In FIGS. 4 and 5, the central zone 15 is connected to the peripheral zone 16 by means of substantially radial arms 17. The number (three in FIGS. 4 and 5) and dimensions of the arms 17 are determined according to the elasticity required for the flexible guide blade. In FIG. 5, the arms are substantially S-shaped.

In the alternative embodiment represented in FIG. 6, the flexible blade 8 is formed by a disk presenting apertures 18 giving the blade the required elasticity. To reduce the diameter of the valve body 3 and consequently the weight of the valve, the alternative embodiments of FIGS. 5 and 6 are preferable. For a given travel and stiffness, these embodiments do in fact enable the external diameter of the flexible guide blades 8 and 11 to be reduced. The alternative embodiment of FIG. 5 is particularly interesting in so far as the flexible blade then presents a tangential elasticity useful for helping center the needle 4 in the seat 2. The flexible guide blades 8 and 11 can be made from any flexible material, in particular metallic, for example stainless steel, a bronze-beryllium alloy or titanium.

Figure 7:
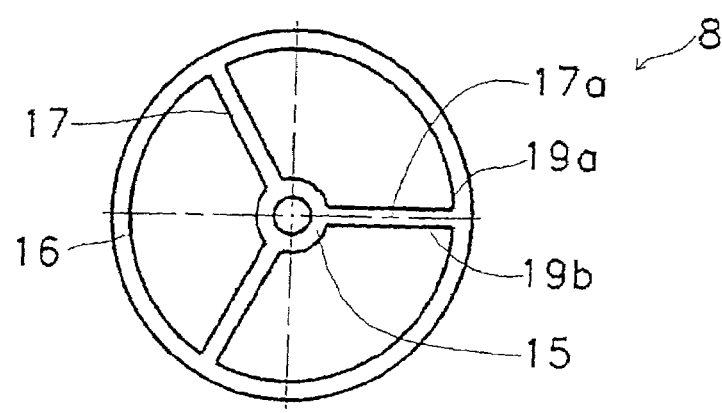
FIGS. 7 and 8 illustrate a particular embodiment of fitting of a strain gage-based position sensor on a flexible guide blade according to FIG. 4, respectively in top view and bottom view.
Figure 8:
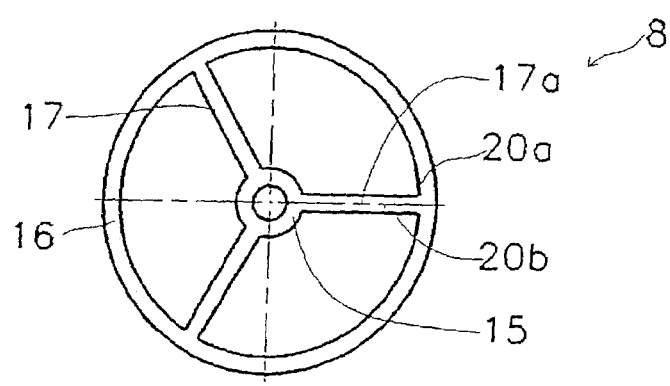
Figure 9:
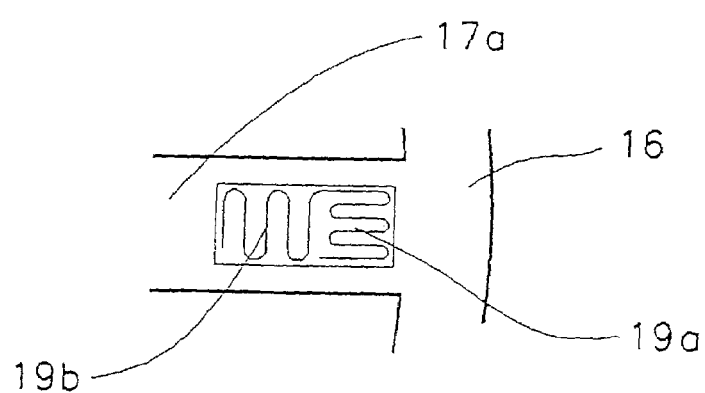
FIG. 9 represents an enlarged view of fitting of the position sensor on the flexible guide blade according to FIG. 7.
Figure 10:
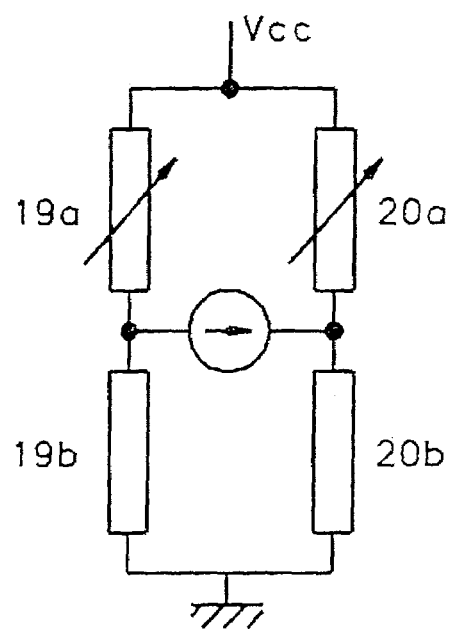
FIG. 10 illustrates the position sensor according to FIGS. 7 and 8 in the form of a wiring diagram.

The valve preferably comprises a device for detecting the position of the needle 4. Such a device notably enables operation of the valve to be linearized, more particularly in the case of a proportional valve. In a first embodiment, illustrated in FIGS. 7 to 10, the device for detecting the position of the needle 4 comprises a strain gage bridge supported by one of the flexible guide blades. FIGS. 7 and 9 represent a top view of a flexible guide blade 8, one of whose arms 17a bears two strain gages 19a and 19b arranged perpendicularly with respect to one another. Two other strain gages 20a and 20b are supported in similar manner by the opposite face of the same arm 17a, as represented in the bottom view in FIG. 8. The strain gages 19a and 20a, placed as close as possible to the point where the flexible guide blade is engaged, i.e. near its peripheral zone 16, constitute two measuring gages, whereas the strain gages 19b and 20b constitute two reference gages. The four strain gages 19a, 19b, 20a and 20b are electrically connected, in the manner represented in FIG. 10, to form a Wheatstone bridge giving the image of the bending stresses generated in a flexible guide blade 8 and consequently an image of the position of the needle 4.

Figure 11:
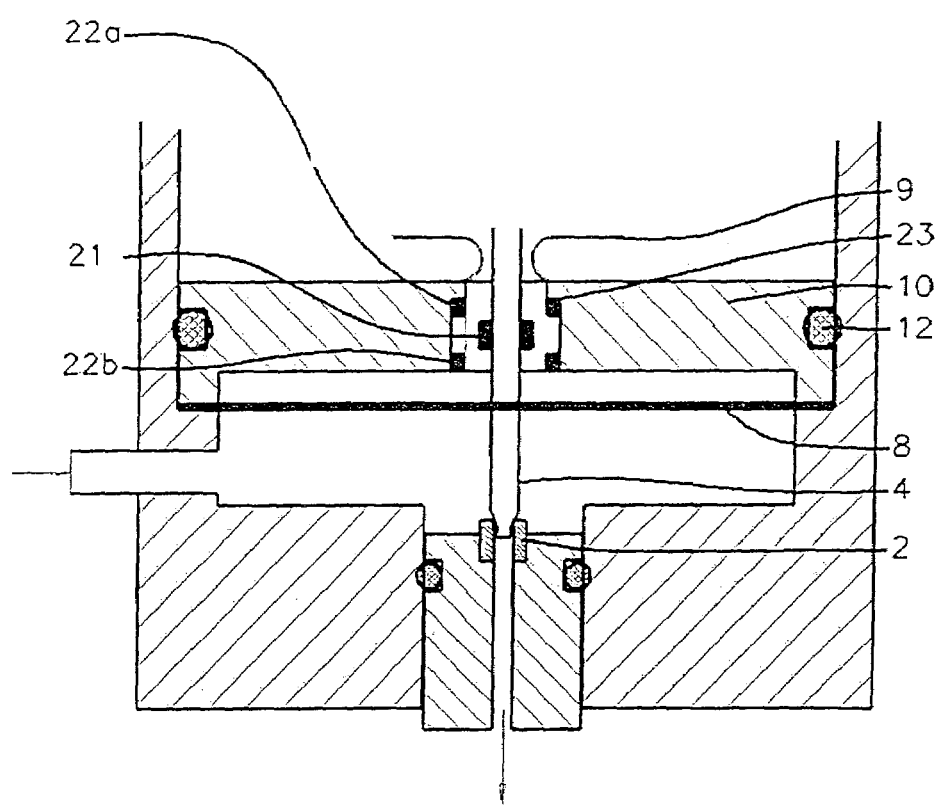
FIG. 11 illustrates a particular embodiment of fitting of a position sensor formed by a differential capacitive sensor in a valve according to the invention.

In another embodiment, illustrated in FIG. 11, the device for detecting the position of the needle 4 comprises a differential capacitive sensor arranged between the needle 4 and an internal face of the cover 10. The differential capacitive sensor comprises for example an electrode 21 borne by the needle and electrodes 22a and 22b borne by the internal face 23 of the cover 10. The electrodes 21, 22a and 22b are substantially concentric and their respective positions enable the position of the needle to be determined. This type of sensor is insensitive to the concentricity of the needle 4 with respect to the valve body 3. Other types of position sensors can be used, notably a sensor formed by a linear variable differential transformer (LVDT).

Figure 12:
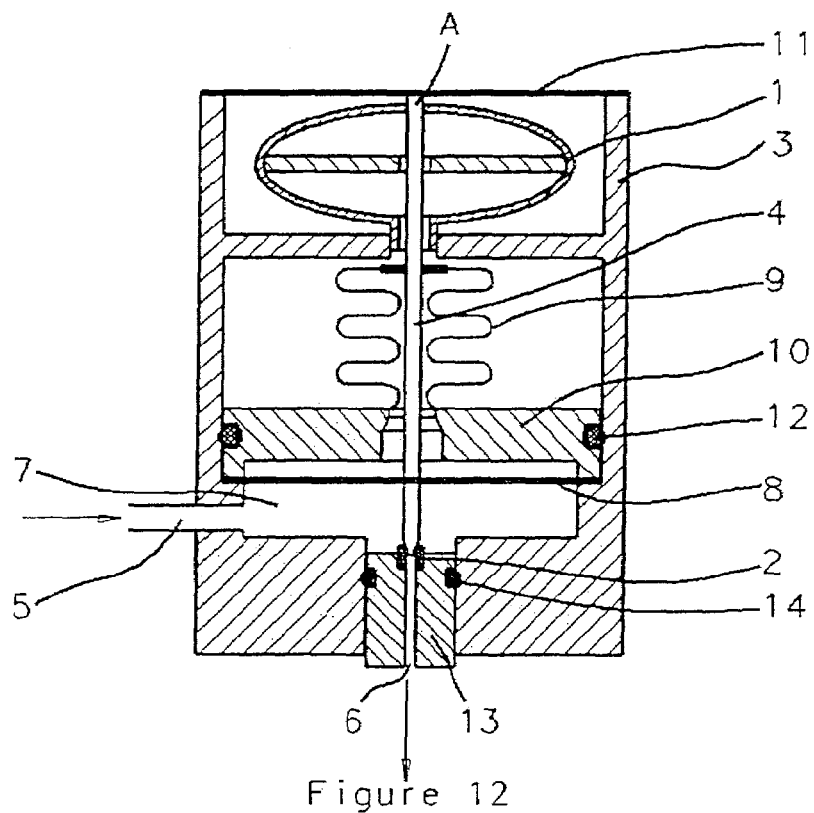
FIG. 12 schematically illustrates a third embodiment of a normally open valve according to the present invention, in cross-section.

FIG. 12 illustrates another particular embodiment of a valve, in this case a normally open valve. The needle 4 is in this case connected to point A of the top of the actuator 1 and passes through the actuator. The base of the actuator 1 is then integral with the valve body 3 in a zone surrounding the needle.

Figure 13:
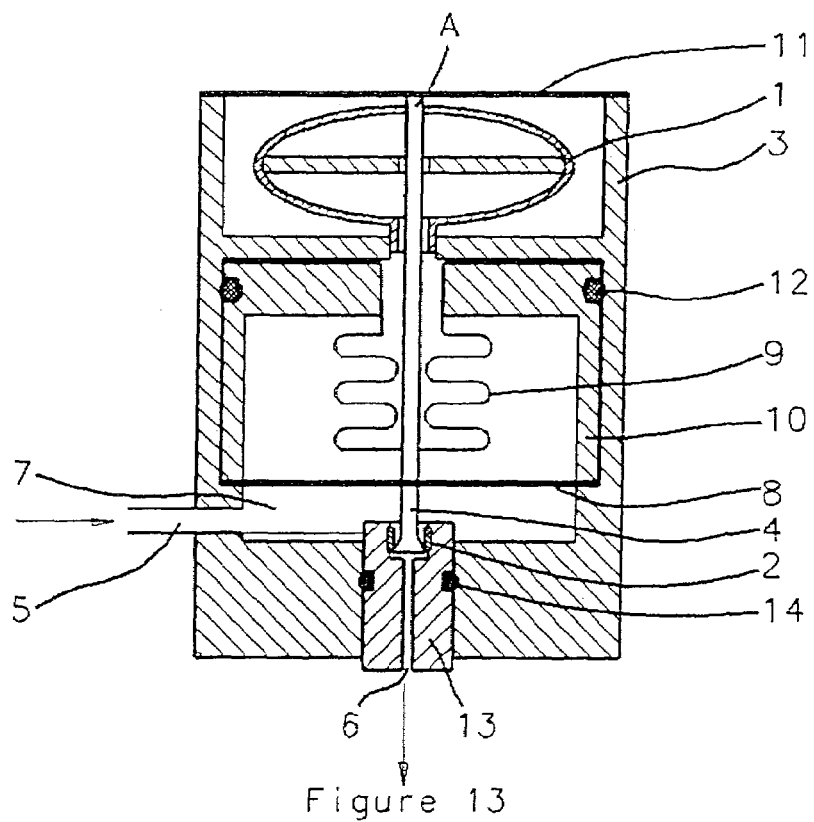
FIG. 13 schematically illustrates a fourth embodiment of a normally closed valve according to the present invention, in cross-section.

Another particular embodiment of the normally closed valve, illustrated in FIG. 13, is more particularly intended for applications having to withstand a high upstream pressure upstream from the seat 2. The needle 4 is, as in FIG. 12, connected to the point A of the top of the actuator 1 and passes through the actuator, the base whereof is connected to the valve body 3. Thus, in the valves of FIGS. 12 and 13, when the actuator 1 is powered, the needle 4 is pushed and not pulled as in the valves of FIGS. 1 to 3. To achieve a normally closed valve using a needle which is pushed downwards, a reverse needle geometry has to be adopted. Thus, in FIG. 13, the bottom end of the needle 4 passes through the seat 2 and is shaped in such a way as to press against the seat in the rest position of the valve. For a better pressure resistance, the outside surface of the bellows 9 is preferably placed inside the pressure chamber 7, as in the valve according to FIG. 3. This configuration is particularly advantageous for valves supporting a high upstream pressure and for fast-acting valves for, when the upstream pressure increases, the needle tends to lift due to the effect of the pressure, which leads to an increase of the sealing force. Furthermore, the moving mass to obtain a normally closed valve that pushes to open is optimized with a needle passing through the actuator and therefore results in a fast-acting valve.

In the embodiments of FIGS. 12 and 13, it is advantageous to place the second flexible guide blade 11, external to the pressure chamber, at the top end of the needle, close to the top of the actuator, above the latter.

Figure 14:
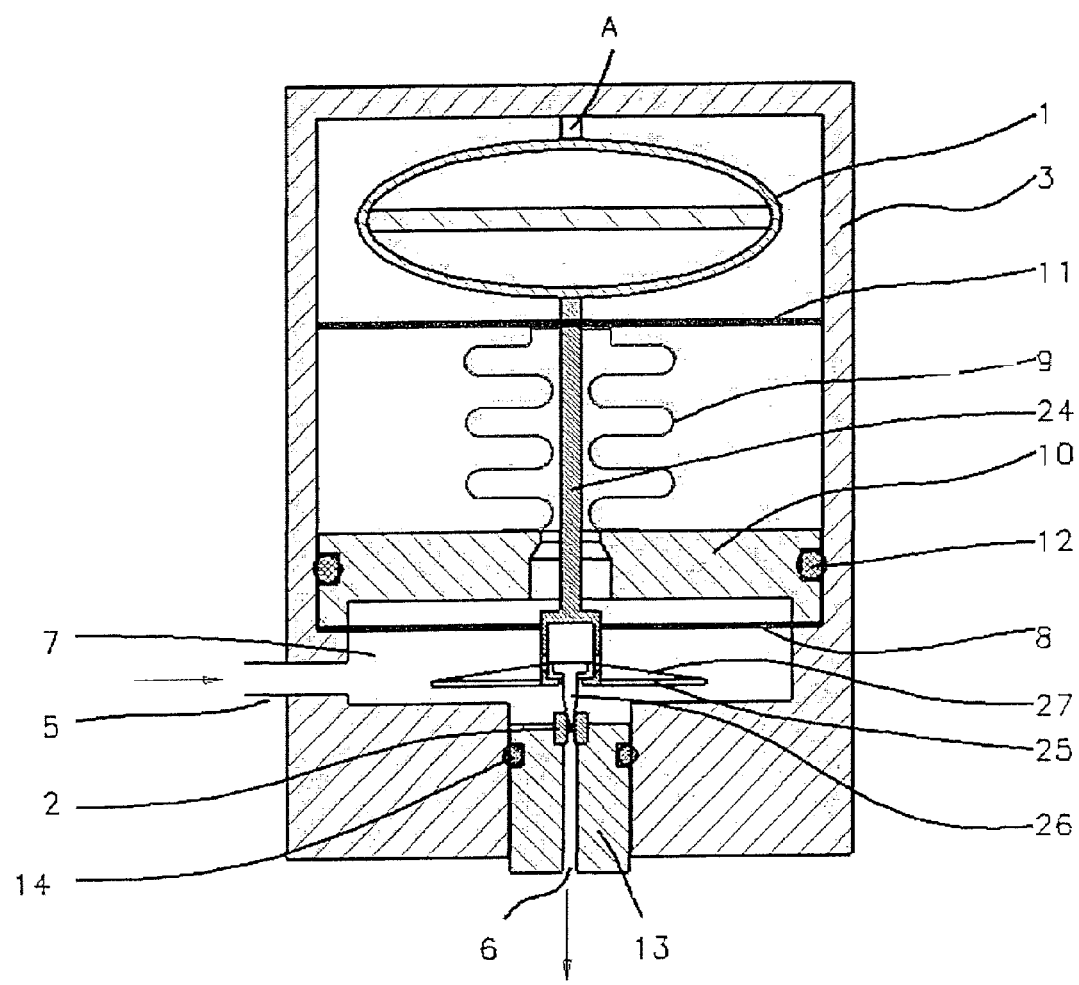
FIG. 14 represents a particular embodiment of a device for limiting the pressure of the needle on the seat in a valve according to FIG. 2.

In FIG. 14, a valve according to FIG. 2 is completed by a particular embodiment of a device for limiting the pressure of the needle on the seat 2. The valve is in fact sensitive to the pressure in the chamber, the needle tending to lift due to the effect of the pressure in the chamber 7. Thus, for high pressures, it may be necessary to anticipate this pressure and therefore to press down with a large pressure on the seat. A buckling effect of the seat may then occur and a pressure limiting device may become useful. In FIG. 14, the needle 4 is formed in two parts. The needle in fact comprises an actuating rod 24 equipped, at its bottom part, with a wide collar 25 integral to the actuating rod. The needle also comprises a tip 26, which forms the part of the needle designed to come into contact with the seat 2. The tip 26 is mobile inside the bottom end of the actuating rod, which enables the pressure of the tip 26 and consequently of the needle on the seat 2 to be limited. When the force between the needle 26 and the seat 2 exceeds a certain value, the tip 26, guided by a third flexible blade 27 connected between the tip and the collar 25, in fact separates from its internal bearing on the actuating rod and moves upwards inside the actuating rod 24, thus limiting the force exerted on the seat 2.

FIG. 14 represents the valve in the situation where there is no pressure on the internal chamber 7 and where adjustment of the sealing force has been made for a high pressure. When pressure is applied in the chamber 7, the actuating rod 24 of the needle rises and the contact between the actuating rod 24 and the needle 26 is re-established. The valve then opens under the tractive action of the actuator.

The flexible blade 27 can have the same shape as the flexible guide blades 8 and 11. The actuating rod 24 comprises, at its bottom part, recesses enabling the flexible blade 27 and the tip 26 to be connected inside the actuating rod.

The valves according to the invention can be fast-acting valves, operating in open-closed or, preferably, in proportional manner and designed to control the flow of any type of fluid (gas or liquid).

The combination of the almost infinite resolution of the piezoelectric actuator 1 and flexible guiding of the needle 4 enables fine and precise guiding of the needle to be achieved. This guiding moreover avoids having to use any part sliding with respect to another part, liable to generate wear or contaminating particles.

In a preferred embodiment, the amplified piezoelectric actuator 1 comprises inserts, preferably made of aluminum, designed to thermomechanically compensate the expansions of the actuator. These inserts 29 can be arranged at the ends, or preferably at the center, of a set 28 of piezoelectric elements (FIG. 2) arranged conventionally inside the actuator to produce a longitudinal deformation of the latter, transformed by the amplified actuator into a deformation along the axis of the needle 4. A high expansion coefficient for these inserts is in fact sought for to compensate the small expansion of the piezoelectric material. Placed in the center, these inserts generally have a higher temperature on account of the heat rise (on actuation) and the low thermal conductivity of the piezoelectric material.

The term bellows covers any elastically deformable element.

The invention is not limited to the particular embodiments described above. In particular, the inlet can constitute the outlet while the outlet constitutes the inlet. This configuration is particularly advantageous in the case of the particular embodiment illustrated in FIG. 13. Indeed, this enables the bellows to see the downstream pressure, which is lower than the upstream pressure due to the pressure losses when the needle passes.

What is claimed is:

1. A valve, comprising:
a valve body;
a seat situated in a pressure chamber and integral with the valve body;
a mobile needle having a movement controlled by an amplified piezoelectric actuator;
a bellows surrounding an intermediate zone of the needle and securely affixed, at a first end, to the valve body and, at a second end, to the needle so as to isolate the actuator from the pressure chamber;
at least one flexible guide blade for guiding the needle being fixed on the one hand to the valve body and on the other hand to the needle; and
a second flexible guide blade, the flexible guide blades being arranged on each side of the bellows.

2. The valve according to claim 1, wherein the bellows is fixed in such a way that the inside of the bellows is placed in the pressure chamber.

3. The valve according to claim 1, wherein the bellows is fixed in such a way that the outside of the bellows is placed in the pressure chamber.

4. The valve according to claim 1, wherein the flexible guide blade comprises a central zone fixed to the needle and a peripheral zone fixed to the valve body.

5. The valve according to claim 4, wherein the central zone of the flexible blade is connected to the peripheral zone of the blade by means of substantially radial arms.

6. The valve according to claim 5, wherein the arms are substantially S-shaped.

7. The valve according to claim 4, wherein the flexible guide blade is formed by a disk presenting apertures.

8. The valve according to claim 1, comprising a cover securely affixed to the valve body, the first end of the bellows being fixed onto the cover, fixing of the flexible blade to the valve body being achieved by engagement between the cover and the valve body.

9. The valve according to claim 1, wherein, the actuator comprising a mobile base, facing the seat, and a top opposite the base and having a point integral with the valve body, the needle is fixed to the amplified piezoelectric actuator at a point of the base.

10. The valve according to claim 1, wherein, the actuator comprising a base, facing the seat and integral with the valve body, and a mobile top opposite the base, the needle is fixed to the amplified piezoelectric actuator at a point of the top and passes through the actuator.

11. The valve according to claim 10, wherein the second flexible guide blade is fixed to the needle close to the top of the actuator.

12. The valve according to claim 10, wherein one end of the needle passes through the seat and is shaped in such a way as to press against the seat in the rest position of the valve.

13. The valve according to claim 1, comprising position detecting means for detecting the position of the needle.

14. The valve according to claim 13, wherein the position detecting means comprise a strain gage bridge supported by one of the flexible guide blades.

15. The valve according to claim 13, wherein the position detecting means comprise a differential capacitive sensor arranged between the needle and a cover securely affixed to the valve body.

16. The valve according to claim 1, wherein the needle comprises an actuating rod and a tip, moving inside one end of the actuating rod and designed to come into contact with the seat, the valve comprising a third flexible blade connected between the tip and a collar integral to the bottom part of the actuating rod.

17. The valve according to claim 1, comprising, in the center of a set of piezoelectric elements of the actuator, inserts designed to thermomechanically compensate the expansions of the actuator.

18. A valve, comprising:
- a valve body;
- a seat situated in a pressure chamber and integral with the valve body;
- a mobile needle having a movement controlled by an amplified piezoelectric actuator;
- a bellows surrounding an intermediate zone of the needle and securely affixed, at a first end, to the valve body and, at a second end, to the needle so as to isolate the actuator from the pressure chamber;
- at least one flexible guide blade for guiding the needle being fixed on the one hand to the valve body and on the other hand to the needle;
- a second flexible guide blade, the flexible guide blades being arranged on each side of the bellows; and
- a cover securely affixed to the valve body, the first end of the bellows being fixed onto the cover, fixing of the flexible blade to the valve body being achieved by engagement between the cover and the valve body.

* * * * *